(12) United States Patent
Ying

(10) Patent No.: US 11,130,543 B2
(45) Date of Patent: Sep. 28, 2021

(54) HUMAN-MACHINE INTERACTION SPORT VEHICLE

(71) Applicant: HANGZHOU CHIC INTELLIGENT TECHNOLOGY CO., LTD, Zhejiang (CN)

(72) Inventor: Jiawei Ying, Zhejiang (CN)

(73) Assignee: HANGZHOU CHIC INTELLIGENT TECHNOLOGY CO., LTD, Zhejiang (CN)

( * ) Notice: Subject to any disclaimer, the term of this patent is extended or adjusted under 35 U.S.C. 154(b) by 512 days.

(21) Appl. No.: 16/079,101

(22) PCT Filed: Feb. 23, 2017

(86) PCT No.: PCT/CN2017/074507
§ 371 (c)(1),
(2) Date: Aug. 23, 2018

(87) PCT Pub. No.: WO2017/143993
PCT Pub. Date: Aug. 31, 2017

(65) Prior Publication Data
US 2021/0053644 A1   Feb. 25, 2021

(30) Foreign Application Priority Data

Feb. 24, 2016  (CN) .......................... 201610100285.5
Feb. 24, 2016  (CN) .......................... 201610100929.0
(Continued)

(51) Int. Cl.
*B62K 11/00* (2006.01)
*B62J 25/04* (2020.01)

(52) U.S. Cl.
CPC ............. *B62K 11/007* (2016.11); *B62J 25/04* (2020.02); *B62K 2204/00* (2013.01)

(58) Field of Classification Search
CPC ............................... B62K 11/007; B62J 25/04
See application file for complete search history.

(56) References Cited

U.S. PATENT DOCUMENTS 8,738,278 B2 * 5/2014 Chen .................... B62K 11/007
                                                      701/124
9,376,155 B2 * 6/2016 Ying .................... B62K 11/007
(Continued)

FOREIGN PATENT DOCUMENTS

CN         104029769         9/2014
CN         104071275         10/2014
(Continued)

OTHER PUBLICATIONS

"International Search Report (Form PCT/ISA/210)", dated May 27, 2017, with English translation thereof, pp. 1-8.

*Primary Examiner* — Tony H Winner
(74) *Attorney, Agent, or Firm* — JCIPRNET

(57) ABSTRACT

A human-machine interaction sport vehicle (10) including a mounting plate, a rotating structure (2), two wheels (3a, 3b), a hub motor, and a balance control system is provided. The rotating structure is configured to connect a first mounting plate (1a) and a second mounting plate (1b), and enables the first mounting plate and the second mounting plate to rotate relative to each other. A first groove (1a3) is formed in a bottom surface of the first mounting plate, a second groove is formed in a bottom surface of the second mounting plate, and the first groove and the second groove are configured to accommodate a rotating rod (2a) in the rotating structure so as to enable the first mounting plate and the second mounting plate to form an integral body with the rotating structure, thus providing a weight-supporting effect.

17 Claims, 5 Drawing Sheets

(30) Foreign Application Priority Data

| Feb. 24, 2016 | (CN) | 201610100947.9 |
| Feb. 24, 2016 | (CN) | 201610100998.1 |
| Feb. 24, 2016 | (CN) | 201610101007.1 |
| Feb. 24, 2016 | (CN) | 201610101009.0 |
| Feb. 24, 2016 | (CN) | 201610101013.7 |
| Feb. 24, 2016 | (CN) | 201610101034.9 |
| Feb. 24, 2016 | (CN) | 201610101814.3 |
| Feb. 24, 2016 | (CN) | 201610101994.5 |
| Feb. 24, 2016 | (CN) | 201610102364.X |

(56) References Cited

U.S. PATENT DOCUMENTS

| 10,421,006 | B1 * | 9/2019 | Li | A63C 17/0093 |
| 10,800,477 | B2 * | 10/2020 | Shang | A63C 17/014 |
| 10,843,765 | B2 * | 11/2020 | Chen | B62J 99/00 |

FOREIGN PATENT DOCUMENTS

| CN | 104443193 | 3/2015 |
| CN | 204415610 | 6/2015 |
| CN | 105539664 | 5/2016 |
| CN | 105539665 | 5/2016 |
| CN | 105539666 | 5/2016 |
| CN | 105539695 | 5/2016 |
| CN | 105620646 | 6/2016 |
| CN | 105644679 | 6/2016 |
| CN | 105667670 | 6/2016 |
| CN | 105667671 | 6/2016 |
| CN | 105730578 | 7/2016 |
| CN | 105730579 | 7/2016 |
| CN | 105752238 | 7/2016 |
| CN | 205365898 | 7/2016 |
| CN | 205365899 | 7/2016 |
| CN | 205396340 | 7/2016 |
| CN | 205396342 | 7/2016 |
| CN | 205396343 | 7/2016 |
| CN | 205469473 | 8/2016 |
| CN | 205469474 | 8/2016 |
| CN | 205469475 | 8/2016 |
| CN | 205469476 | 8/2016 |
| CN | 205469477 | 8/2016 |
| CN | 205554420 | 9/2016 |

* cited by examiner

HUMAN-MACHINE INTERACTION SPORT VEHICLE

CROSS-REFERENCE TO RELATED APPLICATION

This application is a 371 application of the International PCT application serial no. PCT/CN2017/074507, filed on Feb. 23, 2017, which claims the priority benefit of China application no. 201610101009.0, filed on Feb. 24, 2016, the priority benefit of China application no. 201610101013.7, filed on Feb. 24, 2016, the priority benefit of China application no. 201610100947.9, filed on Feb. 24, 2016, the priority benefit of China application no. 201610101034.9, filed on Feb. 24, 2016, the priority benefit of China application no. 201610100285.5, filed on Feb. 24, 2016, the priority benefit of China application no. 201610101994.5, filed on Feb. 24, 2016, the priority benefit of China application no. 201610100929.0, filed on Feb. 24, 2016, the priority benefit of China application no. 201610101814.3, filed on Feb. 24, 2016, the priority benefit of China application no. 201610101007.1, filed on Feb. 24, 2016, the priority benefit of China application no. 201610102364.X, filed on Feb. 24, 2016, and the priority benefit of China application no. 201610100998.1, filed on Feb. 24, 2016. The entirety of each of the abovementioned patent applications is hereby incorporated by reference herein and made a part of this specification.

BACKGROUND OF THE INVENTION

1. Field of the Invention

The present invention relates to a human-machine interaction sport vehicle, of which two platforms for carrying people can twist with each other to drive for walking.

2. Description of Related Art

The human-machine interaction sport vehicle is also known as a somatosensory vehicle or a thinking vehicle. Its operation principle is mainly based on a basic principle called "dynamic stability". Changes of vehicle attitudes are detected by using a gyroscope and an acceleration sensor inside the vehicle body, and the motor is precisely driven by a servo control system to adjust correspondingly, thus keeping the balance of the system.

The conventional human-machine interaction sport vehicle generally has an operating lever. A user stands on the pedal platform of the human-machine interaction sport vehicle to operate the operating lever, so that the human-machine interaction sport vehicle advances, reverses and stops. Such control is called "manual control". At present, the pedal platform of the human-machine interaction sport vehicle is generally a flat plate, which is always kept horizontal during use and cannot be relatively rotated, so that the user cannot control the human-machine interaction sport vehicle only with feet.

SUMMARY OF THE INVENTION

In order to overcome at least one of the deficiencies of the conventional art, the present invention provides a human-machine interaction sport vehicle.

The present invention provides a human-machine interaction sport vehicle, including a mounting plate, a rotating structure, two wheels, a hub motor, and a balance control system. The mounting plate includes a first mounting plate and a second mounting plate which are symmetrically arranged and rotatable relative to each other, and bottom surfaces of the first mounting plate and the second mounting plate are configured with a first groove and a second groove respectively. The rotating structure includes a rotating rod, the rotating rod is accommodated in the first groove and the second groove and rotatably matched with at least one of the first groove and the second groove. The two wheels are disposed on two sides of the mounting plate and capable of rotating about the mounting plate. The hub motor is configured to drive the two wheels to rotate.

The balance control system is connected with the hub motor and configured to control the hub motor to drive the wheels to rotate.

Preferably, top surfaces of the first mounting plate and the second mounting plate are both configured with a plurality of first reinforcing ribs, and the first reinforcing ribs are made of a same material as the first mounting plate, and the first reinforcing ribs are convex strips.

Preferably, the rotating structure comprises a first pressing block, a second pressing block and the rotating rod, the first pressing block and the second pressing block are fixedly mounted on the first mounting plate and the second mounting plate respectively, a first end of the rotating rod is disposed between the first pressing block and the first mounting plate and engaged with the first pressing block, and a second end of the rotating rod is disposed between the second pressing block and the second mounting plate while being rotatably connected with the second pressing block and the second mounting plate in a matching manner.

Preferably, the second end of the rotating rod is sleeved with a sleeve, and is rotatably connected with both the second pressing block and the second mounting plate through the sleeve in a matching manner.

Preferably, the second end of the rotating rod is configured with a first limiting portion, the second pressing block is configured with a second limiting portion thereon, and the first limiting portion is matched with the second limiting portion to limit the rotation angle of the rotating rod.

Preferably, a dimension H of the second limiting portion in a direction perpendicular to the bottom surface of the second mounting plate is smaller than a depth L of the first limiting portion.

Preferably, the first end of the rotating rod is configured with a first engaging portion, the first pressing block is configured with a second engaging portion thereon, and the first engaging portion is engaged with the second engaging portion.

Preferably, the human-machine interaction sport vehicle further includes a top cover and a bottom cover, the mounting plate is located between the top cover and the bottom cover and matched with the two, the top cover is disposed on at top surfaces of the first mounting plate and the second mounting plate, the bottom cover is disposed at bottom surfaces of the first mounting plate and the second mounting plate, the top cover comprises a first top cover and a second top cover which are symmetrically arranged and rotatable relative to each other, and the bottom cover comprises a first bottom cover and a second bottom cover which are symmetrically arranged and rotatable relative to each other.

Preferably, surfaces of the first top cover and the second top cover that face towards the mounting plate are configured with second reinforcing ribs thereon, and the second reinforcing ribs are distributed in a honeycomb shape.

Preferably, surfaces of the first top cover and the second top cover that are away from the mounting plate are each configured with a recessed portion is disposed in a middle position thereof, the recessed portion is configured with a pedal and a foot pad covering the pedal therein, and a plurality of rubbing strips for increasing friction is configured on the foot pad.

Preferably, the first top cover and the second top cover are each connected with an arc-shaped convex cover, one end of the arc-shaped convex cover is engaged into the recessed portion, and the other end is located above one of the wheels and covers a part of the wheel.

Preferably, two prompt plates are disposed at the positions where the first top cover and the second top cover approach each other, the prompt plates are connected with the balance control system, one of the prompt plates is a prompt plate for displaying power capacity, the other one is a prompt plate for displaying whether the sport vehicle works, and a transparent cover is provided on each prompt plate.

Preferably, the balance control system includes a power supply and a circuit board, a controller and a plurality of sensors are configured on the circuit board, the controller is electrically connected with the plurality of sensors, the power supply and the hub motor, and the controller controls the hub motor according to sensing signals transmitted by the sensors to drive the wheels to rotate.

Preferably, the circuit board is disposed between the top cover and the bottom cover and fixed on the top cover, one side of the circuit board is connected with a heat dissipating component, and the heat dissipating component is perpendicular to the surface of the circuit board and accommodated in an accommodating space formed by the top cover and the circuit board.

Preferably, the mounting plate is further configured with a tail lamp, the tail lamp is connected with the balance control system, the tail lamp is configured to light up during deceleration, and a transparent tail lamp cover is configured outside the tail lamp.

Preferably, each of the wheels further includes a fixed axle extending out from a center of the wheel and fixed to the mounting plate.

Preferably, each of the wheels includes a wheel body and a tire, the hub motor is hermetically fixed in the wheel body, and the tire is disposed around the wheel body.

Compared with the conventional art, the human-machine interaction sport vehicle of the present invention has the following advantages:
1. The bottom surfaces of the first mounting plate and the second mounting plate are configured with the first groove and the second groove respectively, and the first groove and the second groove are used for accommodating the rotating rod in the rotating structure, so that the first mounting plate, the second mounting plate and the rotating structure form an integral body to serve as a total mechanical bearing structure for bearing weight. At the same time, the first mounting plate and the second mounting plate are rotatably matched with at least one of the first groove and the second groove to achieve a rotary connection.
2. Since the top surface of the mounting plate (i.e., the first mounting plate and the second mounting plate) is configured with the first reinforcing ribs and the first reinforcing ribs can increase the mechanical strength of the mounting plate, a user can stand on the top surface of the mounting plate directly or stand on the mounting plate after the top cover is disposed thereon. In addition, the first reinforcing ribs are in contact with the soles of user feet to increase friction, so that the user can stand up stably during moving.
3. The overall shape of the mounting plate can cover only an area bearing the feet, and does not require more area, thus further saving materials.

Figure 1:
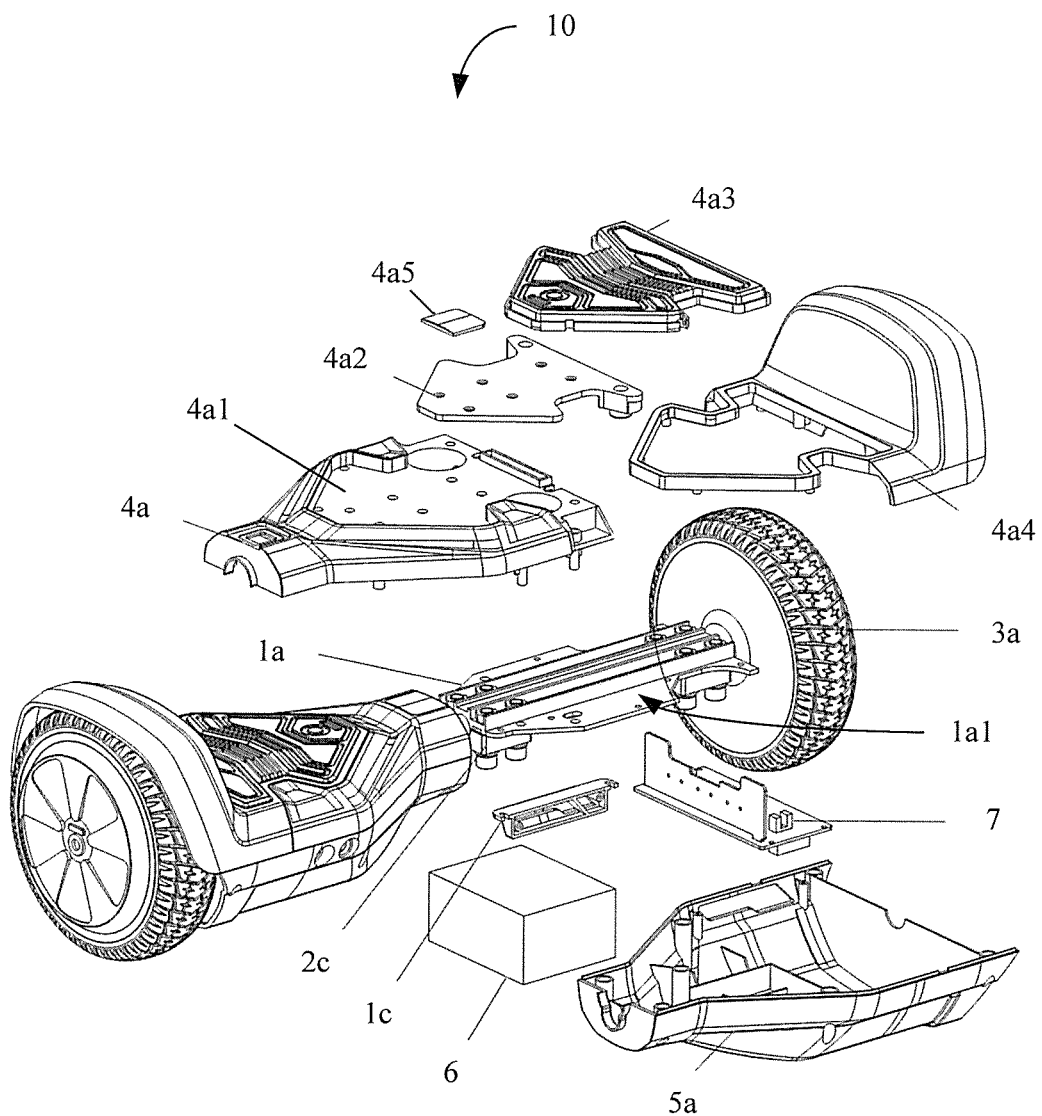
FIG. 1 is an overall structure diagram of a human-machine interaction sport vehicle.

In which, 10: human-machine interaction sport vehicle; 1a: first mounting plate; 1a1: top surface; 1a2: bottom surface; 1a3: first groove; 1a4: first reinforcing rib; 1b: second mounting plate; 1c: tail lamp; 2: rotating structure; 2a: rotating rod; 2a1: first engaging portion; 2a2: first limiting portion; 2b: sleeve; 2c: first pressing block; 2c1: second engaging portion; 2d: second pressing block; 2d1: second limiting portion; 2e: fixing member; 3a: first wheel; 3a1: fixed axle; 3a2: fixed pressing block; 3b: second wheel; 4a: first top cover; 4a1: recessed portion; 4a2: pedal; 4a3: foot pad; 4a4: arc-shaped convex cover; 4a5: indicator lamp; 4a6: second reinforcing rib; 4a7: fixed pillar; 5a: first bottom cover; 6: power supply; 7: circuit board; and 8: heat dissipating component.

DESCRIPTION OF THE EMBODIMENTS

A clear and complete description will be made to the technical solutions in the embodiments of the present invention below. Apparently, the embodiments described are only part of the embodiments of the present invention, not all of them. All other embodiments obtained by a person of ordinary skill in the art based on the embodiments of the present invention without creative efforts shall fall within the protection scope of the present invention.

Referring to FIGS. 1-8, the present invention provides a human-machine interaction sport vehicle 10. The human-machine interaction sport vehicle 10 includes a vehicle body, a rotating structure 2, two wheels, a hub motor, and a balance control system. The vehicle body includes a mounting plate, a top cover and a bottom cover, and the mounting plate is disposed between the top cover and the bottom cover and matched with the two. The mounting plate includes a first mounting plate 1a and a second mounting plate 1b which are symmetrically arranged and rotatable relative to each other. The first mounting plate 1a is rotatably connected with the second mounting plate 1b. The rotating structure 2 is configured to connect the first mounting plate 1a and the second mounting plate 1b, and enables the first mounting plate 1a and the second mounting plate 1b to rotate relative to each other. That is, the first mounting plate 1a is rotatably connected with the second mounting plate 1b through the rotating structure 2. The two wheels are disposed on two sides of the mounting plate and can rotate about the mounting plate. The hub motor is used for outputting power so as to drive the two wheels to rotate. The balance control system is connected with the hub motor for controlling the hub motor to drive the two wheels to rotate.

Referring to FIGS. 1, 2, 5 and 6, the first mounting plate 1a includes a top surface 1a1 and a bottom surface 1a2 which are opposite to each other. The second mounting plate 1b includes a top surface (not shown) and a bottom surface (not shown) which are opposite to each other. A first groove 1a3 and a second groove (not shown) are respectively formed in the bottom surface 1a2 of the first mounting plate 1a and the bottom surface of the second mounting plate 1b. The rotating structure 2 includes a rotating rod 2a. The rotating rod 2a is accommodated in the first groove 1a3 and the second groove. In order to ensure that the first mounting plate 1a and the second mounting plate 1b can rotate relatively, the rotating rod 2a is rotatably matched with at least one of the first groove 1a3 and the second groove.

In the present embodiment, the rotating rod 2a is rotatably matched with the second groove, and the rotating rod 2a is fixedly matched with the first groove 1a3 (they cannot rotate relatively). Further, in the present embodiment, the cross sections of both the first groove 1a3 and the second groove are semicircular, and the rotating rod 2a is a cylindrical drive rod. It can be understood that after the rotating rod 2a is accommodated in the first groove 1a3 and the second groove, the rotating rod 2a can rotate relative to the first groove 1a3 and the second groove. In order to ensure that the rotating rod 2a is rotatably matched with the second groove, the rotating rod 2a is fixedly matched with the first groove 1a3, and components capable of limiting the rotating rod 2a to rotate relative to the first groove 1a3 are provided on the rotating rod 2a and the first groove 1a3.

Figure 6:
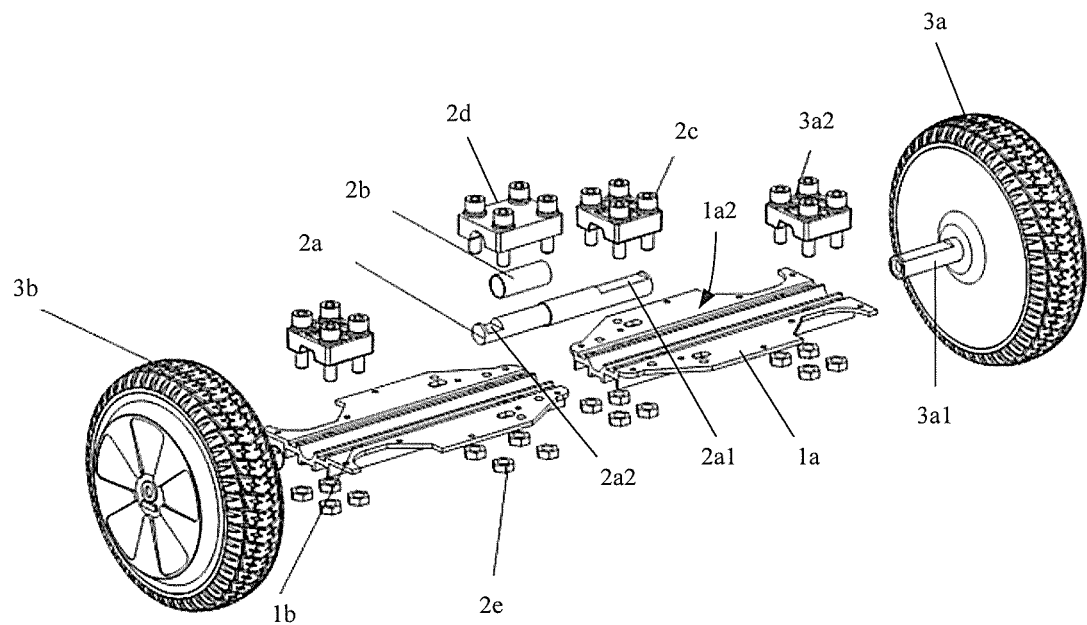
FIG. 6 is an exploded structure diagram of the mounting plate and the rotating structure in FIG. 5.
Figure 7:
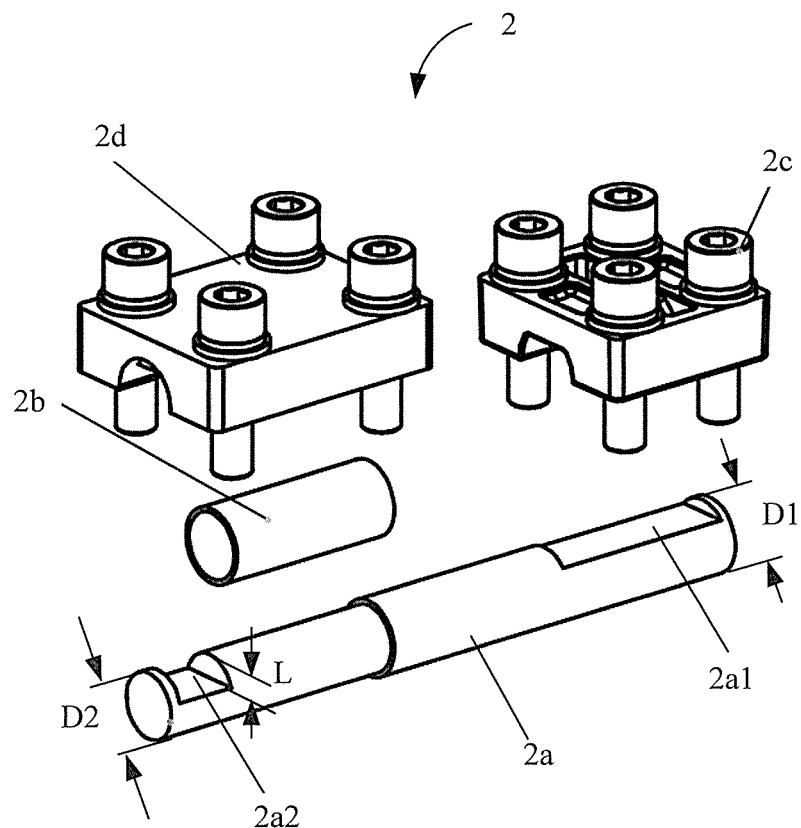
FIG. 7 is an enlarged view of the rotating structure in FIG. 6.

Specifically, referring to FIG. 6 and FIG. 7, the rotating rod 2a includes a first end (not shown) and a second end (not shown) which are opposite to each other. The first end of the rotating rod 2a can be defined as one end being close to the first mounting plate 1a. It can be understood that the first end of the rotating rod 2a can also be defined as one end being away from the first mounting plate 1a. In the present embodiment, the first end of the rotating rod 2a is defined as the end being close to the first mounting plate 1a. The rotating structure 2 further includes a first pressing block 2c and a second pressing block 2d. The first pressing block 2c and the second pressing block 2d are fixedly mounted on the first mounting plate 1a and the second mounting plate 1b, respectively. The first end of the rotating rod 2a is disposed between the first pressing block 2c and the first mounting plate 1a, and is engaged with the first pressing block 2c. The second end of the rotating rod 2a is disposed between the second pressing block 2d and the second mounting plate 1b, and is rotatably connected with the second pressing block 2d and the second mounting plate 1b in a matching manner. Of course, in other embodiments, one end of the rotating rod 2a is square and the other end is circular; correspondingly, the cross section of the first groove 1a3 is square, and the cross section of the second groove is semicircular. In this way, when the rotating rod 2a is mounted in the first groove and the second groove, the squares are matched with each other, and the circles are matched with each other, thus ensuring that the rotating rod 2a is rotatably matched with the second groove, and the rotating rod 2a is fixedly matched with the first groove 1a3 (they cannot rotate relatively).

Figure 8:
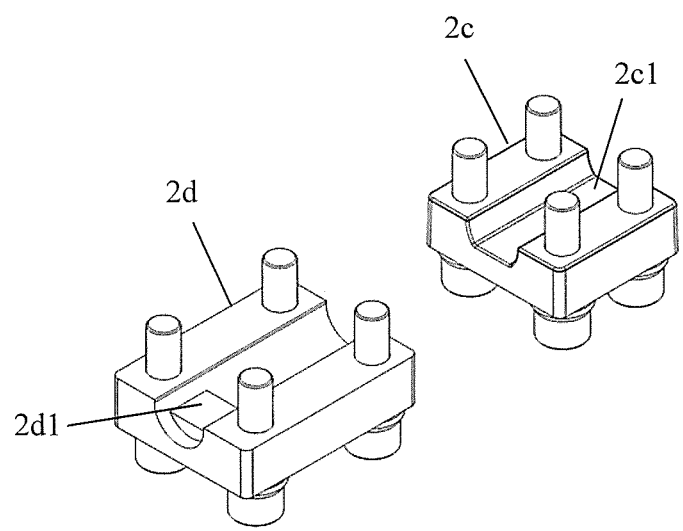
FIG. 8 is an enlarged view of a second pressing block in FIG. 6.

Further, referring to FIG. 7, the first end of the rotating rod 2a is configured with a first engaging portion 2a1. Referring to FIG. 8, the first pressing block 2c is configured with a second engaging portion 2c1 thereon. The second engaging portion 2c1 of the first pressing block 2c is engaged with the first engaging portion 2a1 of the rotating rod 2a. When the first pressing block 2c is fixed to the first mounting plate 1a by a fixing member 2e (e.g., a screw), the second engaging portion 2c1 of the first pressing block 2c is engaged with the first engaging portion 2a1 at the first end of the rotating rod 2a to fix the first end of the rotating rod 2a in the first groove 1a3, so that the first end of the rotating rod 2a is fixedly matched with the first groove 1a3 without relative rotation. Specifically, the second engaging portion 2c1 is a square groove formed in the first pressing block 2c toward the mounting plate 1a, and the first engaging portion 2c1 is a square surface formed on the circumferential surface of the first end of the rotating rod 2a, that is, a square block is formed on the first end of the rotating rod 2a. After the square block on the first end of the rotating rod 2a is located in the square groove of the first pressing block 2c, the first end of the rotating rod 2a is engaged with the first pressing block 2c by the matching between the square groove and the square block.

Referring to FIG. 7 and FIG. 8, the second end of the rotating rod 2a is configured with a first limiting portion 2a2. The second pressing block 2d is configured with a second limiting portion 2a1 thereon. The second limiting portion 2a1 is matched with the first limiting portion 2a2 to limit the rotation angle of the rotating rod 2a.

Specifically, the first limiting portion 2a2 is an arc slot. The second limiting portion 2d1 is a limiting block, and a dimension H of the second limiting portion 2d1 in a direction perpendicular to the bottom surface of the second mounting plate 1b is smaller than a depth L of the first limiting portion 2a2. A maximum rotation angle between the first mounting plate 1a and the second mounting plate 1b can be limited by the cooperation of the first limiting portion 2a2 and the second limiting portion 2d1. The meaning of limiting the maximum rotation angle between the first mounting plate 1a and the second mounting plate 1b is to enable the relative rotation angles of the first mounting plate 1a and the second mounting plate 1b to be within a preset range, so that a user can safely drive the man-machine interaction sport vehicle. It can be understood that the second end of the rotating rod 2a can also be fixed, while the first end is rotatable.

Of course, in other embodiments, the rotating rod 2a can be rotatably matched with both the first groove 1a3 and the second groove. Correspondingly, the rotating structure 2 further includes two second pressing blocks 2d. The structures of the two ends of the rotating rod 2a are similar to the structure of the second end of the rotating rod 2a, the assembly relationship is the same as above, and the descriptions thereof are omitted herein.

In the present embodiment, referring to FIG. 6, the second end of the rotating rod 2a is further configured with a sleeve 2b. The second end of the rotating rod 2a is rotatably connected with the second mounting plate 1b through the sleeve 2b in a matching manner and by cooperating with the second pressing block 2d. The second end of the rotating rod 2a rotates about the axis of the rotating rod 2a through the sleeve 2b. The sleeve 2b is arranged to reduce the contact area between the second end of the rotating rod 2a and the second groove, so as to facilitate the rotation of the second end of the rotating rod 2a while avoiding the wear of the rotating rod 2a to effectively protect the rotating rod 2a.

Referring to FIG. 6, the sleeve 2b is sleeved on the outer surface of the rotating rod 2a close to the second end. The rotating rod 2*a* can be divided into at least two sections, and a step structure is provided between the two sections. The first end of the sleeve 2*b* abuts against the step structure, and the second end of the sleeve 2*b* does not move left and right due to the presence of the first limiting portion 2*a*2 and the second limiting portion 2*d*1.

In other embodiments, the two ends of the rotating rod 2*a* can be rotatably matched with both the first groove 1*a*3 and the second groove. It can be understood that when the two ends of the rotating rod 2*a* can be rotatably matched with both the first groove 1*a*3 and the second groove, the rotating structure 2 further includes two second pressing blocks 2*d*. The two second pressing blocks 2*d* are fixedly mounted to the first mounting plate 1*a* and the second mounting plate 1*b*, respectively. One end of the rotating rod 2*a* is disposed between the second pressing block 2*d* and the first mounting plate 1*a* while being rotatably connected with the two in a matching manner. The other end of the rotating rod 2*a* is provided between the second pressing block 2*d* and the second mounting plate 1*b* while being rotatably connected with the two in a matching manner. Further, in the present embodiment, the two ends of the rotating rod 2*a* are identical in structure and are identical in structure to the second end of the rotating rod 2*a* in the above embodiment. Further, the sleeve 2*b* can also be provided at the two ends of the rotating rod 2*a*. In other embodiments, one end of the rotating rod 2*a* can be fixed to the first mounting plate 1*a* by welding or the like, and the other end is disposed between the second pressing block 2*d* and the second mounting plate 1*b* while being rotatably connected with the two in a matching manner.

The top surface 1*a*1 of the first mounting plate 1*a* may be configured with a plurality of first reinforcing ribs 1*a*4. The first reinforcing ribs 1*a*4 are made of a same material as the first mounting plate 1*a*, that is, the first reinforcing ribs 1*a*4 and the first mounting plate 1*a* can be obtained by an integral molding process. The first mounting plate 1*a* and the second mounting plate 1*b* can be made of a metal-containing material such as iron, aluminum, copper, alloy, etc., so as to ensure that the first mounting plate 1*a* and the second mounting plate 1*b* act as a total mechanical bearing structure. The first mounting plate 1*a* and the second mounting plate 1*b* can serve as a skeleton of the human-machine interaction sport vehicle 10, and can directly bear the weight of the user. The first reinforcing ribs 1*a*4 can be convex strips or in other shapes as long as they can function to strengthen the mechanical properties. The overall shape of the first mounting plate 1*a* is not limited, may be set according to specific needs, and may be rectangular, fish-like or the like. A thickness of the first mounting plate 1*a* is not limited and may be determined according to specific needs and mechanical strength of the materials used. In the present embodiment, the overall shape of the first mounting plate 1*a* is fish-like, the "fish body" may be a pedal area, and the "fishtail" may be used for mounting other elements.

Figure 2:
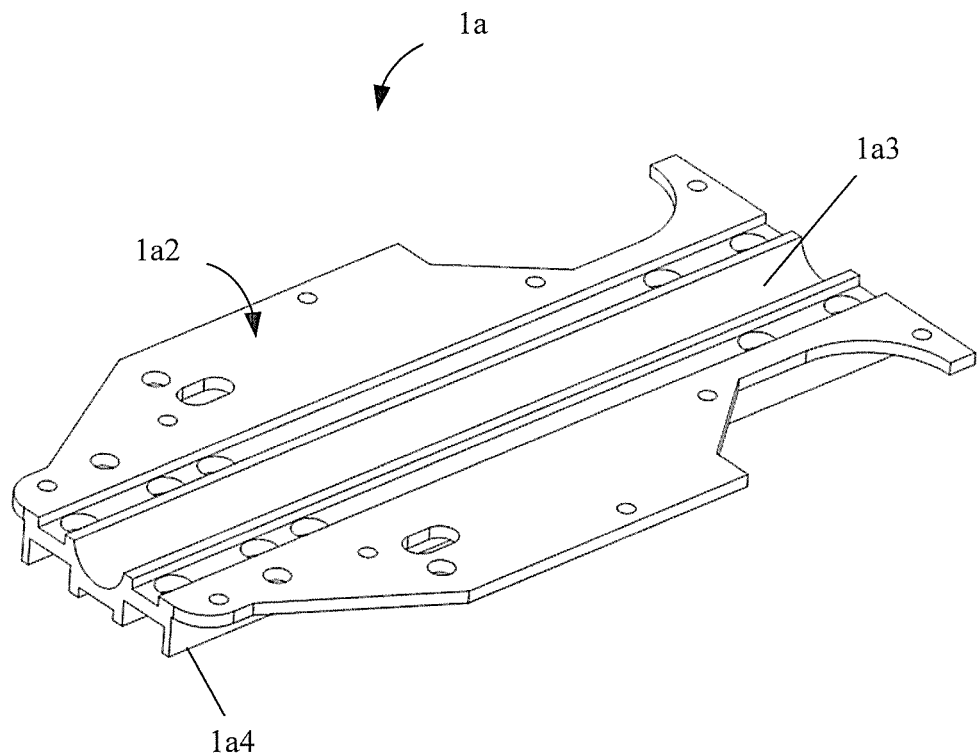
FIG. 2 is a partial structure diagram of a first mounting plate in the human-machine interaction sport vehicle of FIG. 1.

Referring to FIGS. 1 and 2, the top cover 4 includes a second top cover (not shown) and a first top cover 4*a* which are symmetrically arranged and rotatable relative to each other. The first top cover 4*a* is disposed above the first mounting plate 1*a*. That is, the first top cover 4*a* is disposed on the top surface 1*a*1 of the first mounting plate 1*a*. The second top cover is disposed on the top surface of the second mounting plate 1*b*. The second top cover has the same structure as the first top cover 4*a*. The first top cover 4*a* is now used for explanation.

Referring to FIG. 1, a surface of the first top cover 4*a* that is away from the bottom surface 1*a*2 of the first mounting plate 1*a* is configured with a recessed portion 4*a*1 in a middle position thereof. The recessed portion 4*a*1 is configured with a pedal 4*a*2 and a foot pad 4*a*3 covering the pedal 4*a*2. The foot pad 4*a*3 is provided with a plurality of rubbing strips (not shown) for increasing friction.

The shape of the top cover can be designed according to specific needs. Since the top cover is not a total bearing structure, the top cover of different styles and shapes can be replaced according to the preference while the mounting plate is unchanged to meet the needs of users of different ages and individualities.

Further, the second top cover and the first top cover 4*a* are each connected with an arc-shaped convex cover. Taking the first top cover 4*a* as an example, the first top cover 4*a* is connected with an arc-shaped convex cover 4*a*4. The first end of the arc-shaped convex cover 4*a*4 is engaged into the recessed portion 4*a*1, and the second end opposite to the first end is located above the first wheel 3*a* and covers part of the first wheel 3*a*. A contour of the first end of the arc-shaped convex cover 4*a*4 matches a contour of the recessed portion 4*a*1 so as to ensure that the two can be engaged with each other in a matching manner.

Further, positions where the second top cover and the first top cover 4*a* are close to each other are each configured with a prompt plate 4*a*5. The prompt plates 4*a*5 are connected with the balance control system, one of the prompt plates 4*a*5 is a prompt plate for displaying power capacity, the other one is a prompt plate for displaying whether the sport vehicle works, and each prompt plate 4*a*5 has a transparent cover.

Figure 3:
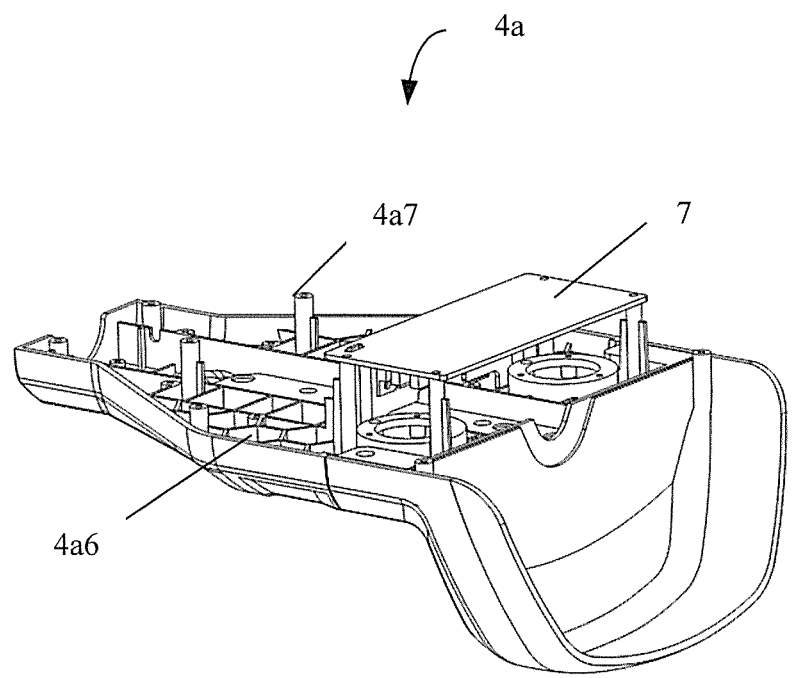
FIG. 3 is a partial structure diagram of a top cover in the human-machine interaction sport vehicle of FIG. 1.
Figure 4:
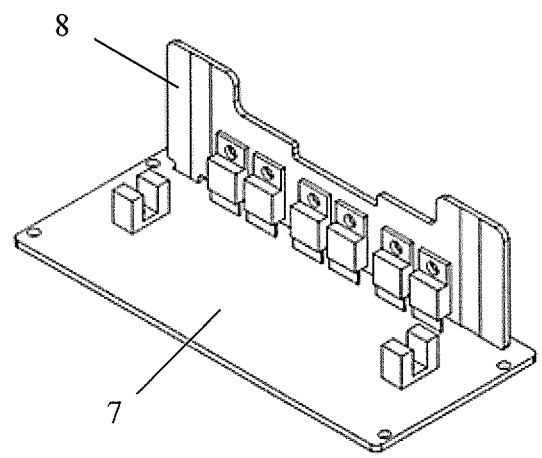
FIG. 4 is an enlarged view of a heat dissipating component in the human-machine interaction sport vehicle of FIG. 1.
Figure 5:
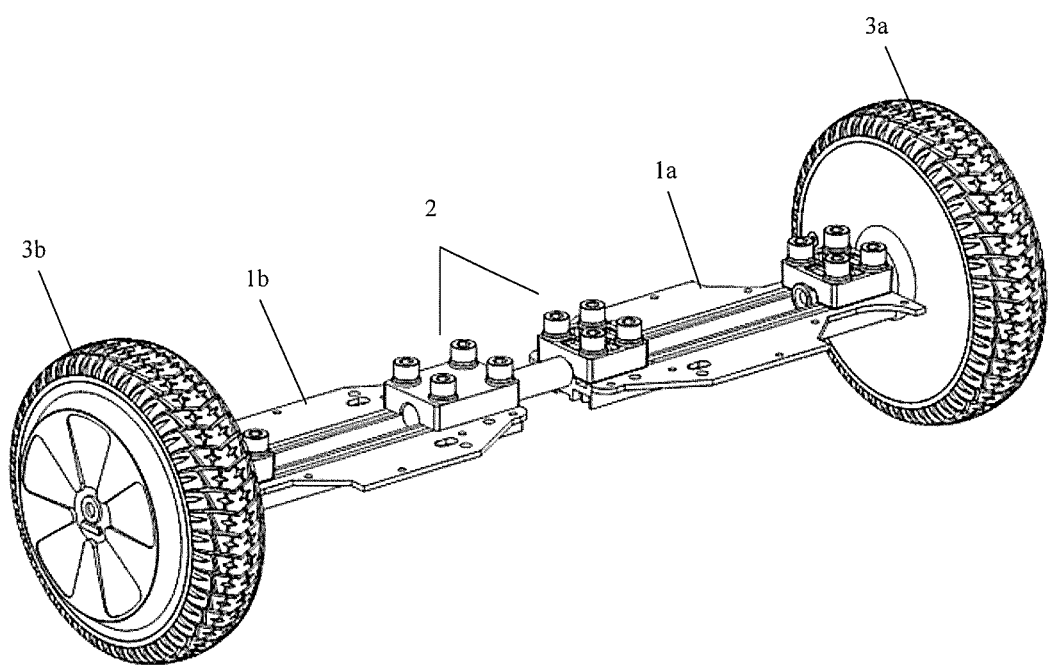
FIG. 5 is a structure diagram of a mounting plate and a rotating structure in the human-machine interaction sport vehicle of FIG. 1.

Referring to FIG. 3, a surface of the first top cover 4*a* that is close to the bottom surface 1*a*2 of the first mounting plate 1*a* is configured with a plurality of second reinforcing ribs 4*a*6 and a plurality of fixed pillars 4*a*7. The overall distribution of the second reinforcing ribs 4*a*6 may be rectangular lattices or honeycomb lattices. The second reinforcing ribs 4*a*6 are plates or pillars raised outward from the surface of the first mounting plate 1*a*. The material for the second reinforcing ribs 4*a*6 is not limited, and may be the same material as for the first mounting plate 1*a*, or may be a different material. The second reinforcing ribs 4*a*6 are arranged to improve the mechanical strength of the first top cover 4*a*. A surface of the second top cover that is close to the mounting plate is also configured with a plurality of second reinforcing ribs and a plurality of fixed pillars, and the descriptions thereof are omitted herein. When the user is located on the top cover, since the top cover (i.e., the second top cover and the first top cover 4*a*) is provided with reinforcing ribs, it has good mechanical strength and is more capable of bearing the weight of the user. Compared with the solution for achieving better mechanical strength by increasing the thickness of the top cover, the top cover provided with the reinforcing ribs not only has good mechanical strength, but also has light overall weight, which is beneficial to reducing the overall load of the human-machine interaction sport vehicle 10.

The top cover and the bottom cover may be made of plastic, which facilitates spraying, coloring and other process on the appearance of the vehicle body and achieves anti-fouling and water-proofing effects while reducing the weight of the entire body. The bottom cover includes a second bottom cover (not shown) and a first bottom cover 5*a* which are symmetrically arranged and rotatable relative to each other. The second bottom cover has the same structure as the first bottom cover 5*a*.

Taking the first bottom cover 5*a* as an example, the first bottom cover 5*a* is disposed below the first mounting plate 1a. The first mounting plate 1a is located between and matched with the first top cover 4a and the first bottom cover 5a. That is, the first top cover 4a is matched with the first bottom cover 5a to clamp the first mounting plate 1a therebetween. The first top cover 4a and the first bottom cover 5a can be fixed together by a buckle, a screw, a chute or the like. In the present embodiment, the first bottom cover 5 is disposed on the bottom surface 1a2 of the first mounting plate 1a.

In the present embodiment, a surface of the first top cover 4a that is close to the top surface 1a1 of the first mounting plate 1a is further configured with a plurality of fixed pillars 4a7, and the fixed pillars 4a7 are hollow pillars. The cross sections of the pillars may be circular, rectangular, rhombic, etc. The plurality of fixed pillars 4a7 may be divided into a first group of fixed pillars, a second group of fixed pillars and a third group of fixed pillars. The first group of fixed pillars is configured to assemble with the bottom cover, the second group of fixed pillars is used for assembling a circuit board 7 of the balance control system, and the third group of fixed pillars is used for assembling the corresponding mounting plate.

The two wheels may be specifically defined as a first wheel 3a and a second wheel 3b. The first wheel 3a is connected with the first mounting plate 1a. The first wheel 3a and the second wheel 3b are opposite. The first wheel 3a and the second wheel 3b are interchangeable when the human-machine interaction sport vehicle 10 rotates 180 degrees. The first wheel 3a has the same structure as the second wheel 3b. The first wheel 3a may include a wheel body and a tire. The hub motor can be mounted to the mounting plate or respectively disposed in the two wheels. In the present embodiment, the hub motor is hermetically fixed in the wheel body, so that a larger-sized hub motor can be used to achieve obvious advantages in motion stroke and speed over a human-machine interaction sport vehicle having a motor mounted at the bottom of the bottom cover. The tire surrounds the wheel body. Referring to FIG. 6, taking the first wheel 3a as an example, the first wheel 3a may further include a fixed axle 3a1. The fixed axle 3a1 extends out from a center position of the first wheel 3a and is fixed to the first mounting plate 1a. The first wheel 3a can be fixed to the first mounting plate 1a by coordination of a fixed pressing block 3a2 and the fixed axle 3a1. It can be understood that the first wheel 3a is fixed to the first mounting plate 1a by not only such method but also other methods, as long as the first wheel 3a is fixed to the first mounting plate 1a.

In the present embodiment, the second reinforcing ribs 4a6 and the plurality of fixed pillars 4a7 are made of a same material as the top cover. The second reinforcing ribs 4a6, the plurality of fixed pillars 4a7 and the first top cover 4a are integrally formed.

The balance control system is disposed in the vehicle body. The balance control system includes a power supply 6 and the circuit board 7. A controller and a plurality of sensors are configured on the circuit board 7 to control running states of the first wheel 3a and the second wheel 3b. Specifically, the circuit board 7 is disposed between the top cover and the bottom cover and fixed on the top cover. More specifically, the circuit board 7 is fixed to the top cover by the fixed pillars 4a7. The power supply 6 is disposed between the mounting plate and the bottom cover. The number of the circuit board 7 may be one, or two, that is, a circuit board 7 is disposed on each of the first top cover 4a and the second top cover. It can be understood that the two circuit boards 7 can share one power supply 6. In the present embodiment, a circuit board 7 is disposed on each of the first top cover 4a and the second top cover.

Specifically, referring to FIG. 3, the circuit board 7 is mounted on the fixed pillars 4a7 of the first top cover 4a. An accommodating space is formed between the circuit board 7 and the first top cover 4a. At this moment, the first mounting plate 1a is engaged onto the first top cover 4a and partially disposed between the first top cover 4a and the circuit board 7. One side of the circuit board 7 is connected with a heat dissipating component 8. The heat dissipating component 8 is perpendicular to the surface of the circuit board 7. The accommodating space is used for accommodating the heat dissipating component 8 to well protect the heat dissipating component 8. At the same time, the space can be fully utilized by such a way that the heat dissipating component 8 is perpendicular to the circuit board 7, so that the overall size is relatively small. Compared with the conventional method of directly bonding the heat dissipating component to the circuit board, the heat dissipating component 8 is perpendicular to the circuit board 7 so that the airflow space at two sides thereof can be used for sufficiently dissipating heat, and the heat dissipation efficiency is high. The heat dissipating component 8 can be fixed to the circuit board 7 by soldering or the like. It can be understood that a plurality of electronic components that dissipate much heat, such as power tubes (unmarked), may also be disposed on the side, close to the circuit board 7, of the heat dissipating component 8. The heat dissipating component 8 may be made of iron, aluminum, copper, alloy, etc. Of course, the structure and principle adopted for disposing the circuit board on the fixed pillars of the second top cover are the same as the above, and the descriptions thereof are omitted herein.

The controller is electrically connected with the plurality of sensors, the power supply 6 and the hub motor. The controller controls the hub motor according to the sensing signals transmitted by the sensors to drive the wheels to rotate. Specifically, the sensors include a gyroscope, an acceleration sensor and an inductive switch. The inductive switch is used for sensing whether the user is standing on the human-machine interaction sport vehicle to turn on or off. The controller receives a sensing signal of the inductive switch to control whether the hub motor works. The controller receives the sensing signals of the acceleration sensor and the gyroscope to control whether the hub motor changes the state. Specifically, the plane where the two pedals are located tilts forward, tilts backward or is parallel to the horizontal plane by controlling the center of gravity of the user, so that the human-machine interaction sport vehicle accelerates forward, decelerates and moves backward, or runs at a constant speed, that is, achieving "human-machine interaction".

Further, the mounting plate is further configured with a tail lamp 1c, and the tail lamp 1c is connected with the balance control system. The tail lamp 1c is powered by the balance control system and controlled by it to turn on or off. The tail lamp 1c is configured to light up during deceleration. A transparent tail lamp cover (not shown) is configured outside the tail lamp 1c.

The descriptions of the above embodiments are merely used for assisting in understanding the method of the present invention and the core idea thereof. It should be pointed out that those of ordinary skill in the art may further make improvements and modifications to the present invention without departing from the principle of the present invention, and these improvements and modifications shall fall within the protection scope of the claims of the present invention.

The above descriptions of the disclosed embodiments enable those skilled in the art to implement or use the present invention. Various modifications to these embodiments are obvious to those skilled in the art, and the general principles defined herein may be implemented in other embodiments without departing from the spirit or scope of the present invention. Therefore, the present invention will not to be limited to these embodiments described herein, but conforms to the widest scope consistent with the principle and novelty disclosed herein.

What is claimed is:

1. A human-machine interaction sport vehicle, comprising:
   a mounting plate, comprising a first mounting plate and a second mounting plate which are symmetrically arranged and rotatable relative to each other, bottom surfaces of the first mounting plate and the second mounting plate being configured with a first groove and a second groove respectively;
   a rotating structure, comprising a rotating rod, the rotating rod being accommodated in the first groove and the second groove and rotatably matched with at least one of the first groove and the second groove;
   two wheels, disposed on two sides of the mounting plate and capable of rotating about the mounting plate;
   a hub motor, configured to drive the two wheels to rotate; and
   a balance control system, connected with the hub motor and configured to control the hub motor to drive the wheels to rotate.

2. The human-machine interaction sport vehicle according to claim 1, wherein top surfaces of the first mounting plate and the second mounting plate are both configured with a plurality of first reinforcing ribs, the first reinforcing ribs are made of a same material as the first mounting plate, and the first reinforcing ribs are convex strips.

3. The human-machine interaction sport vehicle according to claim 1, wherein the rotating structure comprises a first pressing block, a second pressing block and the rotating rod, the first pressing block and the second pressing block are fixedly mounted on the first mounting plate and the second mounting plate respectively, a first end of the rotating rod is disposed between the first pressing block and the first mounting plate and engaged with the first pressing block, and a second end of the rotating rod is disposed between the second pressing block and the second mounting plate while being rotatably connected with the second pressing block and the second mounting plate in a matching manner.

4. The human-machine interaction sport vehicle according to claim 3, wherein the second end of the rotating rod is sleeved with a sleeve, and is rotatably connected with both the second pressing block and the second mounting plate through the sleeve in a matching manner.

5. The human-machine interaction sport vehicle according to claim 3, wherein the second end of the rotating rod is configured with a first limiting portion, the second pressing block is configured with a second limiting portion thereon, and the first limiting portion is matched with the second limiting portion to limit a rotation angle of the rotating rod.

6. The human-machine interaction sport vehicle according to claim 5, wherein a dimension H of the second limiting portion in a direction perpendicular to the bottom surface of the second mounting plate is smaller than a depth L of the first limiting portion.

7. The human-machine interaction sport vehicle according to claim 3 wherein the first end of the rotating rod is configured with a first engaging portion, the first pressing block is configured with a second engaging portion thereon, and the first engaging portion is engaged with the second engaging portion.

8. The human-machine interaction sport vehicle according to claim 1, further comprising a top cover and a bottom cover, wherein the mounting plate is located between the top cover and the bottom cover and matched with the two covers, the top cover is disposed at top surfaces of the first mounting plate and the second mounting plate, the bottom cover is disposed at bottom surfaces of the first mounting plate and the second mounting plate, the top cover comprises a first top cover and a second top cover which are symmetrically arranged and rotatable relative to each other, and the bottom cover comprises a first bottom cover and a second bottom cover which are symmetrically arranged and rotatable relative to each other.

9. The human-machine interaction sport vehicle according to claim 8, wherein surfaces of the first top cover and the second top cover that face towards the mounting plate are configured with second reinforcing ribs thereon, and the second reinforcing ribs are distributed in a honeycomb shape.

10. The human-machine interaction sport vehicle according to claim 8, wherein surfaces of the first top cover and the second top cover that are away from the mounting plate are each configured with a recessed portion in a middle position thereof, the recessed portion is configured with a pedal and a foot pad covering the pedal therein, and a plurality of rubbing strips for increasing friction is configured on the foot pad.

11. The human-machine interaction sport vehicle according to claim 10, wherein the first top cover and the second top cover are each connected with an arc-shaped convex cover, one end of the arc-shaped convex cover is engaged into the recessed portion, and the other end is located above one of the wheels and covers a part of the wheel.

12. The human-machine interaction sport vehicle according to claim 8, wherein two prompt plates are disposed at positions where the first top cover and the second top cover approach each other, the prompt plates are connected with the balance control system, one of the prompt plates is a prompt plate for displaying power capacity, the other one is a prompt plate for displaying whether the sport vehicle works, and a transparent cover is provided on each prompt plate.

13. The human-machine interaction sport vehicle according to claim 8, wherein the balance control system comprises a power supply and a circuit board, a controller and a plurality of sensors are configured on the circuit board, the controller is electrically connected with the plurality of sensors, the power supply and the hub motor, and the controller controls the hub motor according to sensing signals transmitted by the sensors to drive the wheels to rotate.

14. The human-machine interaction sport vehicle according to claim 13, wherein the circuit board is disposed between the top cover and the bottom cover and fixed on the top cover, one side of the circuit board is connected with a heat dissipating component, and the heat dissipating component is perpendicular to a surface of the circuit board and accommodated in an accommodating space formed by the top cover and the circuit board.

15. The human-machine interaction sport vehicle according to claim 1, wherein the mounting plate is further configured with a tail lamp, the tail lamp is connected with the balance control system, the tail lamp is configured to light up during deceleration, and a transparent tail lamp cover is configured outside the tail lamp.

16. The human-machine interaction sport vehicle according to claim 1, wherein each of the wheels further comprises a fixed axle extending out from a center of the wheel and fixed to the mounting plate.

17. The human-machine interaction sport vehicle according to claim 16, wherein each of the wheels comprises a wheel body and a tire, the hub motor is hermetically fixed in the wheel body, and the tire surrounds the wheel body.

* * * * *